(12) United States Patent
Nagashima et al.

(10) Patent No.: US 10,620,074 B2
(45) Date of Patent: Apr. 14, 2020

(54) PRESSURE GAUGE WITH VARIABLE MEASUREMENT RANGE AND DISPLAY THEREOF

(71) Applicants: Yokogawa Electric Corporation, Musashino-shi, Tokyo (JP); Yokogawa Test & Measurement Corporation, Musashino-shi, Tokyo (JP)

(72) Inventors: Hirokazu Nagashima, Tokyo (JP); Tadahiko Iinuma, Tokyo (JP); Toshiaki Kawakami, Tokyo (JP)

(73) Assignees: Yokogawa Electric Corporation, Musashino-shi, Tokyo (JP); Yokogawa Test & Measurement Corporation, Musashino-shi, Tokyo (JP)

( * ) Notice: Subject to any disclaimer, the term of this patent is extended or adjusted under 35 U.S.C. 154(b) by 147 days.

(21) Appl. No.: 15/828,544

(22) Filed: Dec. 1, 2017

(65) Prior Publication Data
US 2018/0202885 A1    Jul. 19, 2018

(30) Foreign Application Priority Data
Jan. 16, 2017 (JP) .................. 2017-004952

(51) Int. Cl.
G01L 19/02      (2006.01)
G01L 9/00       (2006.01)
G01L 9/02       (2006.01)

(52) U.S. Cl.
CPC ............ *G01L 19/02* (2013.01); *G01L 9/0051* (2013.01); *G01L 9/02* (2013.01)

(58) Field of Classification Search
USPC .................................................. 73/700–756
See application file for complete search history.

(56) References Cited

U.S. PATENT DOCUMENTS

| 9,394,895 B2 * | 7/2016 | Jiang ...................... F04B 35/04 |
| 2008/0173073 A1 * | 7/2008 | Downie ............... F17C 13/025 73/49.8 |
| 2011/0203382 A1 * | 8/2011 | Kim ........................ G01L 7/043 73/732 |
| 2017/0168034 A1 * | 6/2017 | Fenton ............... G01N 33/0036 |

FOREIGN PATENT DOCUMENTS

| CN | 103376171 A | 10/2013 |
| JP | 57052967 B2 | 11/1982 |
| JP | 05085859 B2 | 12/1993 |
| JP | 07052579 Y2 | 11/1995 |
| JP | 2001-66210 A | 3/2001 |

* cited by examiner

*Primary Examiner* — Andre J Allen
(74) *Attorney, Agent, or Firm* — Sughrue Mion, PLLC

(57) ABSTRACT

A pressure gauge includes: a pressure sensor; a display unit configured to display a measurement value of the pressure sensor; and a measurement controller configured to set, as a measurement range of the pressure sensor, any of a plurality of measurement ranges defined by a lower limit value specific to the pressure sensor and respective upper limit values that are equal to or lower than an upper limit value specific to the pressure sensor and are different from each other, and to avoid that the display unit displays the measurement value when the measurement value exceeds a display upper limit value dependent on the upper limit value of the measurement range that is set.

5 Claims, 4 Drawing Sheets

PRESSURE GAUGE WITH VARIABLE MEASUREMENT RANGE AND DISPLAY THEREOF

CROSS-REFERENCE TO RELATED APPLICATION

This application claims priority from Japanese Patent Application No. 2017-004952 filed with the Japan Patent Office on Jan. 16, 2017, the entire content of which is hereby incorporated by reference.

BACKGROUND

1. Technical Field

The present disclosure relates to a pressure gauge.

2. Description of the Related Art

As a pressure sensor to be mounted in a pressure gauge, a mechanical pressure sensor is widely used. The mechanical pressure sensor makes use of deformation of a metal or the like occurring due to the effect of pressure. The degree of the deformation of the metal or the like occurring due to the pressure is converted into an electric signal by any of various methods, and is then outputted as a measurement result. A representative component that is made of the metal or the like and is to be subjected the pressure is a diaphragm.

For the pressure sensor, a measurement range regarding a measurement scope and a permissible excessive pressure is specified according to characteristics of the diaphragm and/or the like. Further, for the specific measurement range thus specified, a unique measurement accuracy is determined. Generally, the measurement accuracy is worked out according to evaluation of properties such as hysteresis, reproducibility, and linearity based on predetermined criteria. The discussion here focuses on the hysteresis.

Generally, the pressure sensor has a hysteresis characteristic. Even with the same pressure applied to the pressure sensor, an output value observed during pressure increase and an output value observed during pressure decrease are different from each other. FIG. 5 shows one example of a difference between an output value of the pressure sensor and an actual pressure value (reference gauge value), observed in a case where a pressure (applied pressure) applied to the pressure sensor is increased from zero to a predetermined value and is then decreased to zero.

As indicated by a broken line circle in FIG. 5, when the applied pressure is zero, the hysteresis is large and accordingly the effect of the hysteresis on the output value is also large. Therefore, a difference between an output value of the pressure sensor observed when the applied pressure is zero before increase of the applied pressure and an output value of the pressure sensor observed when the applied pressure is returned to zero is defined as a magnitude of the hysteresis of the pressure sensor. Performing such measurement repeatedly multiple times results in achievement (evaluation) of a maximum hysteresis of the pressure sensor. Based on this, an accuracy specification of the pressure gauge including the pressure sensor is specified.

FIG. 6 shows one example of a relationship between a magnitude of the applied pressure and a magnitude of the hysteresis of the pressure sensor (an error when the applied pressure is returned to zero). As shown in FIG. 6, as the applied pressure becomes greater, the hysteresis of the pressure sensor becomes greater. Further, a maximum value of the applied pressure depends on the measurement range of the pressure gauge including this pressure sensor.

A technique in this field is described, for example, in JP-A-2001-66210.

SUMMARY

A pressure gauge includes: a pressure sensor; a display unit configured to display a measurement value of the pressure sensor; and a measurement controller configured to set, as a measurement range of the pressure sensor, any of a plurality of measurement ranges defined by a lower limit value specific to the pressure sensor and respective upper limit values that are equal to or lower than an upper limit value specific to the pressure sensor and are different from each other, and to avoid that the display unit displays the measurement value when the measurement value exceeds a display upper limit value dependent on the upper limit value of the measurement range that is set.

DESCRIPTION OF THE EMBODIMENTS

Figure 1:
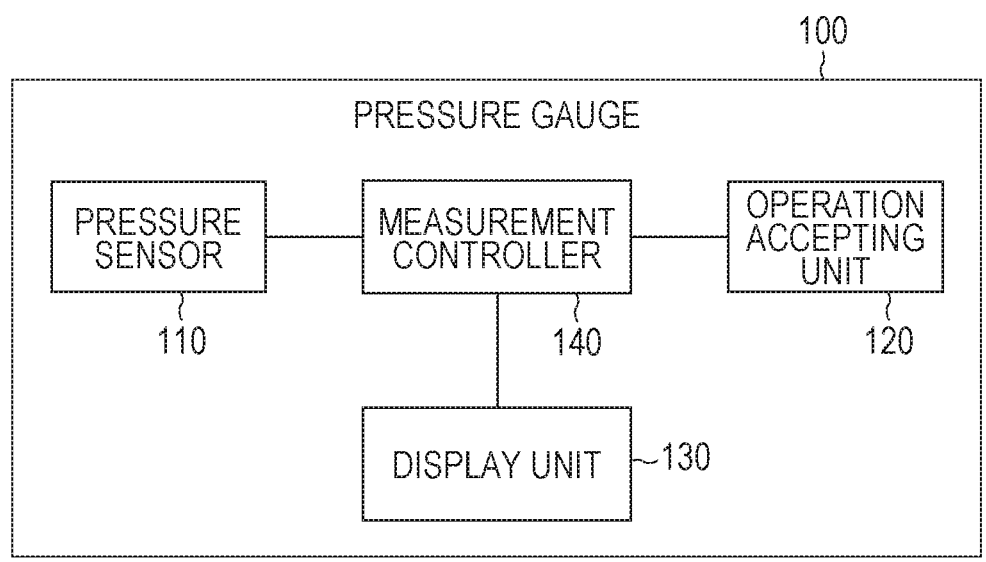
FIG. 1 is a block diagram illustrating a configuration of a pressure gauge according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As described above, as an upper limit value of the measurement range becomes greater, the hysteresis (hysteresis error) becomes greater and hence a full-scale error also becomes greater. Accordingly, as the upper limit value of the measurement range becomes greater, the measurement accuracy is reduced. In a low-pressure area of the measurement range, a relative error amount with respect to a measurement value is large. Thus, especially in this area, the measurement accuracy is reduced outstandingly.

By limiting the upper limit value of the measurement range to narrow the measurement range, it is possible to reduce the hysteresis. This makes it possible to reduce the full-scale error to enhance the accuracy. However, as this narrows the measurement range, different pressure gauges are selectively used depending on different measurement subjects, for example. This leads to deterioration of the usability of the pressure gauge.

In view of this, one object of the present disclosure is to provide a pressure gauge with which both a broad measurement range and an improved accuracy can be achieved.

A pressure gauge according to one aspect of the present disclosure includes: a pressure sensor; a display unit configured to display a measurement value of the pressure sensor; and a measurement controller configured to set, as a measurement range of the pressure sensor, any of a plurality of measurement ranges defined by a lower limit value specific to the pressure sensor and respective upper limit values that are equal to or lower than an upper limit value specific to the pressure sensor and are different from each other, and to avoid that the display unit displays the measurement value when the measurement value exceeds a display upper limit value dependent on the upper limit value of the measurement range that is set.

The plurality of measurement ranges may include: a first measurement range defined by the lower limit value and a first upper limit value, which is the upper limit value specific to the pressure sensor; and a second measurement range defined by the lower limit value and a second upper limit value, which is lower than the first upper limit value. The measurement controller may avoid that the display unit displays the measurement value when the measurement value exceeds a display upper limit value dependent on the first upper limit value while the first measurement range is set, and may avoid that the display unit displays the measurement value when the measurement value exceeds a display upper limit value dependent on the second upper limit value while the second measurement range is set.

Here, the plurality of measurement ranges may further include a third measurement range defined by the lower limit value and a third upper limit value, which is lower than the second upper limit value. The measurement controller may avoid that the display unit displays the measurement value when the measurement value exceeds a display upper limit value dependent on the third upper limit value while the third measurement range is set.

Further, the measurement controller may display, on the display unit, the fact that an overrange occurs, when the measurement value exceeds the display upper limit value.

The pressure gauge may further include an operation accepting unit configured to accept an instruction given by a user. The measurement controller may set the measurement range of the pressure sensor according to the instruction given by the user via the operation accepting unit.

According to the above-described aspects, it is possible to provide a pressure gauge with which both a broad measurement range and an improved accuracy can be achieved.

Embodiments of the present disclosure will be described with reference to the drawings. FIG. 1 is a block diagram illustrating a configuration of a pressure gauge 100 according to an embodiment of the present disclosure. As shown in FIG. 1, the pressure gauge 100 includes a pressure sensor 110, an operation accepting unit 120, a display unit 130, and a measurement controller 140.

The pressure sensor 110 measures a pressure applied by a measurement subject, and outputs a measurement value. The pressure sensor 110 includes a diaphragm that is configured to be deformed in response to the pressure applied by the measurement subject. The pressure sensor 110 has a function of converting, into an electric signal, a deformation amount of the diaphragm corresponding to the pressure. The pressure sensor 110 has a specific measurement range defined by a lower limit value and an upper limit value. The lower limit value is, for example, 0 MPa. The upper limit value is, for example, 16 MPa. These lower and upper limit values are values specific to the pressure sensor 110.

Note that the present embodiment is applicable also to a pressure sensor having a measurement range having an upper limit value lower than the above.

The operation accepting unit 120 includes an operation element such as a button, and accepts an operation (instruction) made by a user. The operation accepting unit 120 may have a communication function. In this case, the operation accepting unit 120 may be configured to accept a user's operation from other device via communication. The display unit 130 includes a display device such as a liquid crystal panel, and displays a measurement value, an operation menu, and the like. Alternatively, a touch panel that integrally includes the display unit 130 and the operation accepting unit 120 may be used. The measurement controller 140 controls a measurement operation of the pressure gauge 100.

Figure 2:
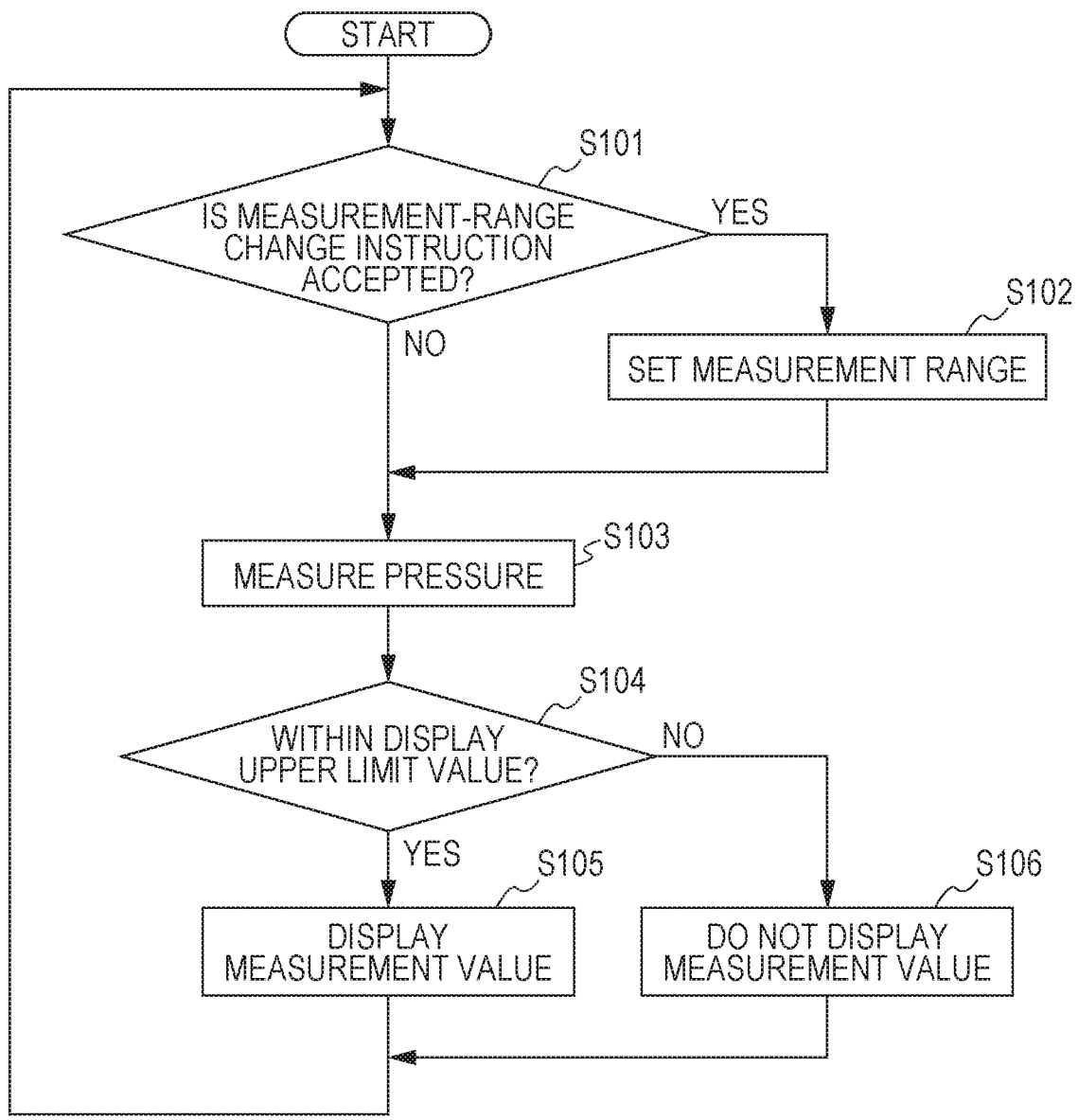
FIG. 2 is a flow chart illustrating a characteristic operation of the pressure gauge according to the embodiment of the present disclosure.

Next, with reference to the flow chart shown in FIG. 2, the following will describe a characteristic operation of the pressure gauge 100 according to the present embodiment. This operation is performed under control of the measurement controller 140 according to a user's operation.

Figure 3:
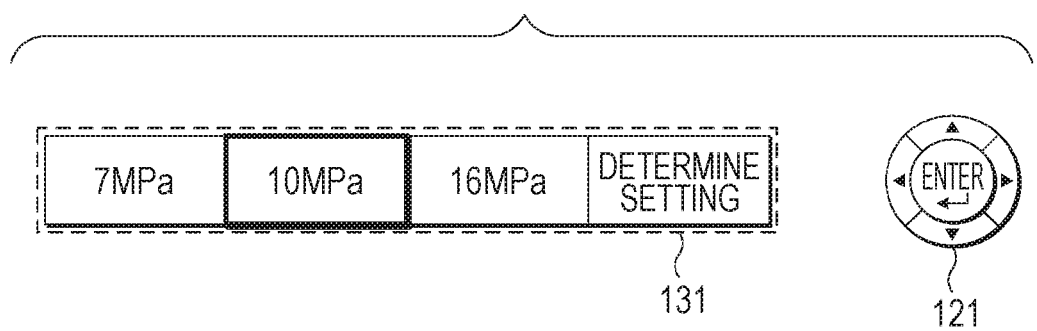
FIG. 3 is a view illustrating an example of a measurement-range setting menu.

In the pressure gauge 100, the measurement controller 140 can accept a measurement-range change instruction (change of the measurement range) given by the user (S101). For example, as shown in FIG. 3, the display unit 130 displays a measurement-range setting menu 131. For example, the user operates a cursor button 121 in the operation accepting unit 120 to select any of the buttons corresponding to respective upper limit values in the measurement-range setting menu 131. As a result of this operation, the measurement controller 140 can accept the measurement-range change instruction (change of the measurement range). Alternatively, the measurement controller 140 may be configured to accept the measurement-range change instruction via communication with other device. The measurement range thus changed (the measurement range conforming to the change instruction) is set (stored) in the measurement controller 140 (S102). In this manner, according to the present embodiment, the measurement controller 140 sets the measurement range of the pressure sensor 110 according to the instruction given by the user via the operation accepting unit 120.

In the present embodiment, the measurement range specific to the pressure sensor 110 is 0 to 16 MPa. 16 MPa is an upper limit value (first upper limit value) specific to the pressure sensor 110. In the present embodiment, the upper limit value of the measurement range is divided into three: 7 MPa (third upper limit value), 10 MPa (second upper limit value), and 16 MPa (first upper limit value).

The user can select the upper limit value of the measurement range from the three upper limit values of 7 MPa, 10 MPa, and 16 MPa. Namely, the user may select any of the three measurement ranges of 0 to 7 MPa (third measurement range), 0 to 10 MPa (second measurement range), and 0 to 16 MPa (first measurement range). The measurement controller 140 sets the selected measurement range as the measurement range of the pressure sensor 110.

As described above, in the pressure gauge 100 according to the present embodiment, a plurality of measurement ranges includes the three measurement ranges of 0 to 7 MPa (third measurement range), 0 to 10 MPa (second measurement range), and 0 to 16 MPa (first measurement range). The first measurement range is defined by the lower limit value and the upper limit value (first upper limit value) that are specific to the pressure sensor 110. The second measurement range is defined by the lower limit value specific to the pressure sensor 110 and the second upper limit value, which is lower than the first upper limit value. The third measurement range is defined by the lower limit value specific to the pressure sensor 110 and the third upper limit value, which is lower than the second upper limit value.

Note that the above-described number of division of the upper limit value (the number of options for the upper limit value) and the above-described numerical values of the respective options for the upper limit value are described as an example.

Thus, in the pressure gauge 100 according to the present embodiment, the measurement controller 140 sets, as the measurement range of the pressure sensor 110, any of the plurality of measurement ranges defined by the lower limit value specific to the pressure sensor 110 and the respective upper limit values that are equal to or lower than the upper limit value specific to the pressure sensor 110 and are different from each other.

Figure 4:
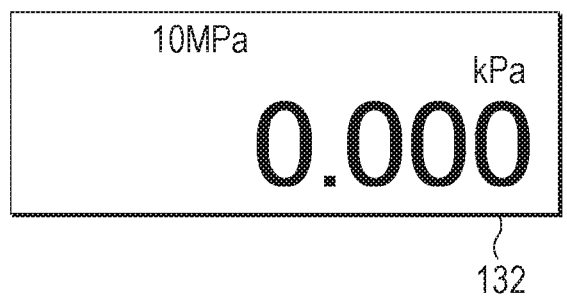
FIG. 4 is a view illustrating an example of a display screen for a measurement value.
Figure 5:
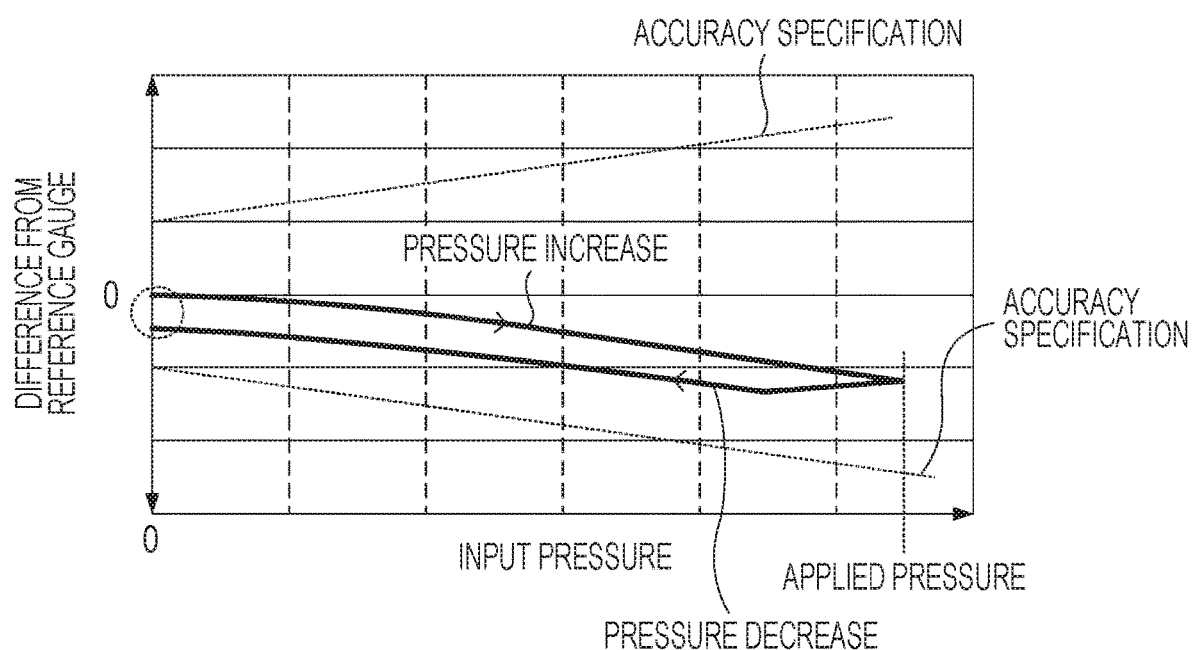
FIG. 5 shows one example of a difference between an output value of a pressure sensor and an actual pressure value, observed in a case where a pressure (applied pressure) applied to the pressure sensor is increased from zero to a predetermined value and is then decreased to zero.
Figure 6:
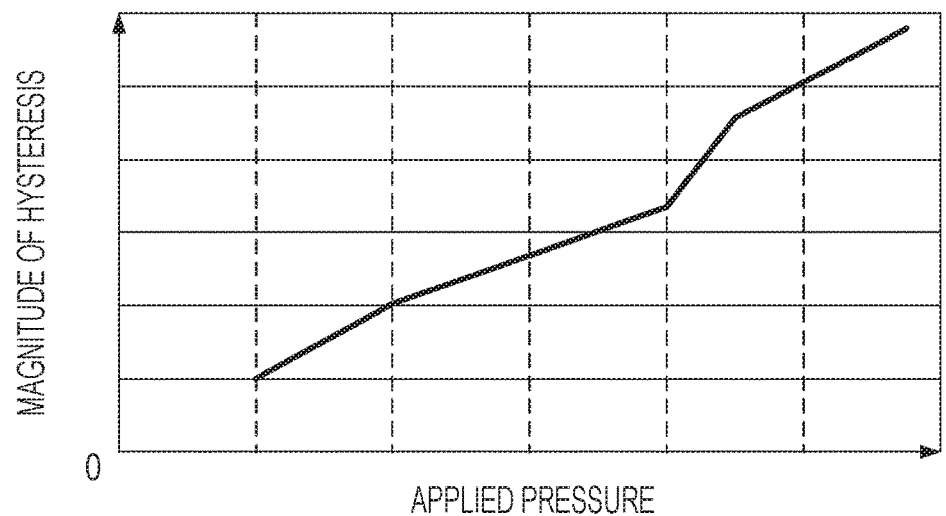
FIG. 6 shows one example of a relationship between the magnitude of the applied pressure and the magnitude of the hysteresis of the pressure sensor.

As described above, the hysteresis of the pressure sensor 110 becomes greater as the applied pressure increases. Thus, in the present embodiment, the upper limit value of the applied pressure (the upper limit value of the measurement range) is limited, so that an error caused by the hysteresis is reduced. The measurement controller 140 displays the upper limit value of the measurement range that is set, on a measurement screen 132 in the manner shown in FIG. 4, for example. In FIG. 4, it is indicated that the upper limit value of the measurement range is 10 MPa. Namely, in the example shown in FIG. 4, the measurement range of 0 to 10 MPa (second measurement range) is selected.

For the measurement ranges, display upper limit values that are dependent on their respective upper limit values are respectively specified. Here, a value 1.2 times greater than an upper limit value is specified as a display upper limit value. Thus, for the measurement range of 0 to 7 MPa, the display upper limit value is 8.4 MPa. For the measurement range of 0 to 10 MPa, the display upper limit value is 12.0 MPa. For the measurement range of 0 to 16 MPa, the display upper limit value is 19.2 MPa. The display upper limit values are provided to secure accuracies in the measurement ranges. Note that the display upper limit value is not limited to the value 1.2 times greater than the upper limit value.

Note that, for example, the display upper limit values may be specified for the respective measurement ranges, and may be values greater than the upper limit values of the respective measurement ranges. Furthermore, the display upper limit values may be maximum measurement values that can be regarded as measurement values with which the measurement accuracies for the respective measurement ranges can be maintained or maximum measurement values with which the measurement accuracies for the respective measurement ranges can be maintained.

In the present embodiment, the upper limit value of the measurement range is divided. Thus, in a measurement range of a low-pressure-area side (a measurement range having a small upper limit value), the applied pressure is limited and thus an error caused by the hysteresis is reduced. Also, the full-scale error is reduced. As a result, for example, measurement accuracies as shown below are achieved for the respective measurement ranges:

A measurement accuracy for the measurement range of 0 to 7 MPa: ±(0.02% of a read value±2 kPa)
A measurement accuracy for the measurement range of 0 to 10 MPa: ±(0.02% of a read value+3 kPa)
A measurement accuracy for the measurement range of 0 to 16 MPa: ±(0.02% of a read value+5 kPa)

Typically, only the measurement accuracy for the measurement range of 0 to 16 MPa has been specified. Thus, even for pressure measurement in the low-pressure-area side of 10 MPa or lower, the measurement accuracy for the upper limit value of 16 MPa (the measurement accuracy for the measurement range of 0 to 16 MPa) has been applied. On the other hand, the pressure gauge 100 according to the present embodiment allows for selection of an appropriate measurement range, thereby enhancing the measurement accuracy in the low-pressure-area side while maintaining the broad measurement range of 0 to 16 MPa.

In the state where any of the measurement ranges is set, pressure measurement is performed (S103). The measurement controller 140 determines whether or not the measurement value obtained is within (equal to or lower than) the display upper limit value of the measurement range that is set (S104).

If the measurement value obtained is within the display upper limit value of the measurement range that is set (S104: Yes), the measurement accuracy for the measurement range can be secured. Accordingly, the measurement controller 140 displays the measurement value on the display unit 130 (S105).

Meanwhile, if the measurement value obtained exceeds the display upper limit value of the measurement range that is set (S104: No), there is a possibility that the measurement accuracy for the measurement range is not secured. Thus, the measurement controller 140 does not display the measurement value (S106). In this manner, the measurement controller 140 is configured to avoid that the display unit 130 displays the measurement value of the pressure sensor 110 when the measurement value exceeds the display upper limit value dependent on the upper limit value of the measurement range that is set.

At this time, the measurement controller 140 may display, on the display unit 130, the fact that the measurement value exceeds the display upper limit value of the measurement range (i.e., the fact that an overrange occurs). In this manner, the measurement controller 140 can inform the user that the measurement range is inappropriate.

A pressure gauge according to an embodiment of the present disclosure may be any of first to third pressure gauges described below.

A first pressure gauge includes: a pressure sensor having a specific measurement range for which a lower limit value and an upper limit value are specified; a display unit for displaying a measurement result; and a measurement controller which is capable of setting a first measurement range defined by the lower limit value and the upper limit value and a second measurement range defined by the lower limit value and a first intermediate value lower than the upper limit value, which does not display the measurement result on the display unit when the measurement value exceeds a display upper limit value set depending on the upper limit value while the first measurement range is set, and which does not display the measurement result on the display unit when the measurement value exceeds a display upper limit value set depending on the first intermediate value while the second measurement range is set.

A second pressure gauge is the first pressure gauge, wherein the measurement controller is further capable of setting a third measurement range defined by the lower limit value and a second intermediate value lower than the first intermediate value, and does not display the measurement result on the display unit when the measurement value exceeds a display upper limit value set depending on the second intermediate value while the third measurement range is set.

A third pressure gauge is the first or second pressure gauge, wherein the measurement controller displays, on the display unit, the fact that an overrange occurs, when the measurement value exceeds the display upper limit value.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A pressure gauge comprising:
   a pressure sensor;
   a display unit configured to display a measurement value of the pressure sensor; and
   a measurement controller configured to set, as a measurement range of the pressure sensor, any of a plurality of measurement ranges defined by a lower limit value specific to the pressure sensor and respective upper limit values that are equal to or lower than an upper limit value specific to the pressure sensor and are different from each other, and to avoid that the display unit displays the measurement value when the measurement value exceeds a display upper limit value dependent on the upper limit value of the measurement range that is set.

2. The pressure gauge according to claim 1, wherein the plurality of measurement ranges includes:
   a first measurement range defined by the lower limit value and a first upper limit value, which is the upper limit value specific to the pressure sensor; and
   a second measurement range defined by the lower limit value and a second upper limit value, which is lower than the first upper limit value, wherein
   the measurement controller avoids that the display unit displays the measurement value when the measurement value exceeds a display upper limit value dependent on the first upper limit value while the first measurement range is set, and avoids that the display unit displays the measurement value when the measurement value exceeds a display upper limit value dependent on the second upper limit value while the second measurement range is set.

3. The pressure gauge according to claim 2, wherein the plurality of measurement ranges further includes a third measurement range defined by the lower limit value and a third upper limit value, which is lower than the second upper limit value, wherein
   the measurement controller avoids that the display unit displays the measurement value when the measurement value exceeds a display upper limit value dependent on the third upper limit value while the third measurement range is set.

4. The pressure gauge according to claim 1, wherein the measurement controller displays, on the display unit, the fact that an overrange occurs, when the measurement value exceeds the display upper limit value.

5. The pressure gauge according to claim 1, further comprising an operation accepting unit configured to accept an instruction given by a user, wherein
   the measurement controller sets the measurement range of the pressure sensor according to the instruction given by the user via the operation accepting unit.

* * * * *